(12) United States Patent
Iwasaki et al.

(10) Patent No.: US 7,671,919 B2
(45) Date of Patent: Mar. 2, 2010

(54) CAMERA

(75) Inventors: Keiichi Iwasaki, Tokyo (JP); Yukimasa Yamaguchi, Tokyo (JP); Kiyoshi Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 805 days.

(21) Appl. No.: 11/072,561

(22) Filed: Mar. 4, 2005

(65) Prior Publication Data

US 2005/0206780 A1 Sep. 22, 2005

(30) Foreign Application Priority Data

Mar. 18, 2004 (JP) ............................. P2004-078216

(51) Int. Cl.
*H04N 5/225* (2006.01)
*G03B 17/02* (2006.01)
(52) U.S. Cl. .................. 348/373; 348/374; 348/375; 596/535
(58) Field of Classification Search ................ 348/373, 348/374, 375, 335, 340; 596/535
See application file for complete search history.

(56) References Cited

U.S. PATENT DOCUMENTS

| 5,400,072 | A | * | 3/1995 | Izumi et al. | 348/335 |
|---|---|---|---|---|---|
| 5,894,369 | A | * | 4/1999 | Akiba et al. | 359/820 |
| 6,400,901 | B2 | * | 6/2002 | Akami et al. | 396/29 |
| RE38,308 | E | * | 11/2003 | Ito | 359/700 |
| 6,733,143 | B1 | * | 5/2004 | Anzai et al. | 359/513 |
| 7,093,944 | B2 | * | 8/2006 | Tanaka | 359/611 |
| 2002/0029103 | A1 | * | 3/2002 | Breed et al. | 701/45 |
| 2002/0135887 | A1 | * | 9/2002 | Nomura et al. | 359/699 |
| 2003/0209893 | A1 | * | 11/2003 | Breed et al. | 280/735 |
| 2005/0030379 | A1 | * | 2/2005 | Luskin et al. | 348/148 |

FOREIGN PATENT DOCUMENTS

| JP | 62-96629 | 6/1987 |
|---|---|---|
| JP | 63-113137 | 5/1988 |
| JP | 01-214813 | 8/1989 |
| JP | 06-141219 | 5/1994 |
| JP | 10-148744 | 6/1998 |
| JP | 10-148745 | 6/1998 |
| JP | 10-170794 | 6/1998 |
| JP | 10-186486 | 7/1998 |
| JP | 11-019029 | 1/1999 |
| JP | 2000-069336 | 3/2000 |
| JP | 2001-124970 | 5/2001 |

(Continued)

*Primary Examiner*—Nhan T Tran
*Assistant Examiner*—Quang V Le
(74) *Attorney, Agent, or Firm*—Robert J. Depke; Rockey, Depke & Lyons, LLC

(57) ABSTRACT

First to fourth lenses are aligned in an optical axis direction by a lens-barrel of a camera, an O-ring is disposed between the first lens and the lens-barrel, an O-ring is disposed between the fourth lens and the lens-barrel, a space is formed between the first and second lenses, a space is formed between the second and fourth lenses, a space is formed between the third and fourth lenses, and flow of air between the spaces is precluded. The camera thus configured is free of dewing on the lens or a protective plate exposed to the exterior, even when the inside temperature is raised due to heat generation in a CCD or a mounting substrate on which the CCD is mounted.

9 Claims, 9 Drawing Sheets

FOREIGN PATENT DOCUMENTS

| | | |
|---|---|---|
| JP | 2002-062465 | 2/2002 |
| JP | 2002-350701 | 12/2002 |
| JP | 2002-365560 | 12/2002 |
| JP | 2003-025911 | 1/2003 |
| JP | 2003-084181 | 3/2003 |
| JP | 2003-161994 | 6/2003 |
| JP | 2005-250348 | 9/2005 |

* cited by examiner

FIG. 2
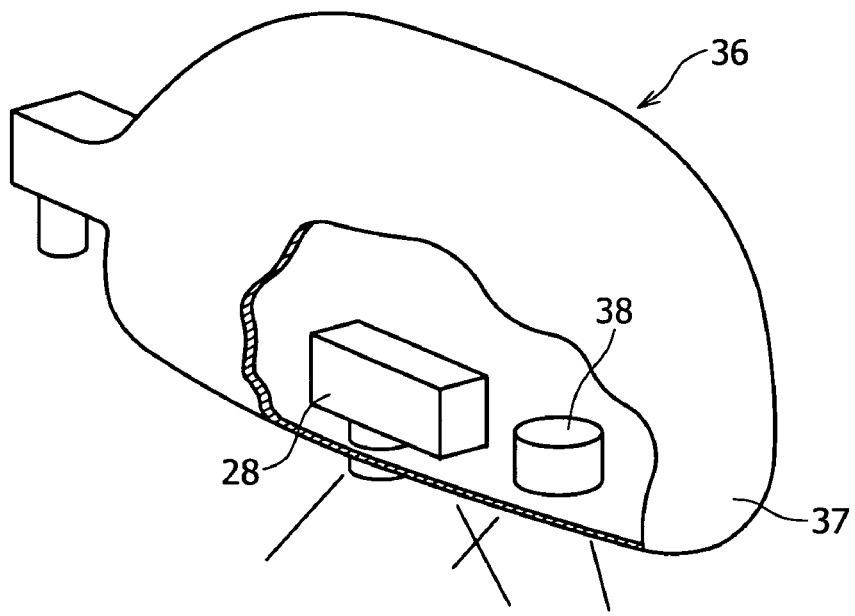
FIG. 3A
FIG. 3B
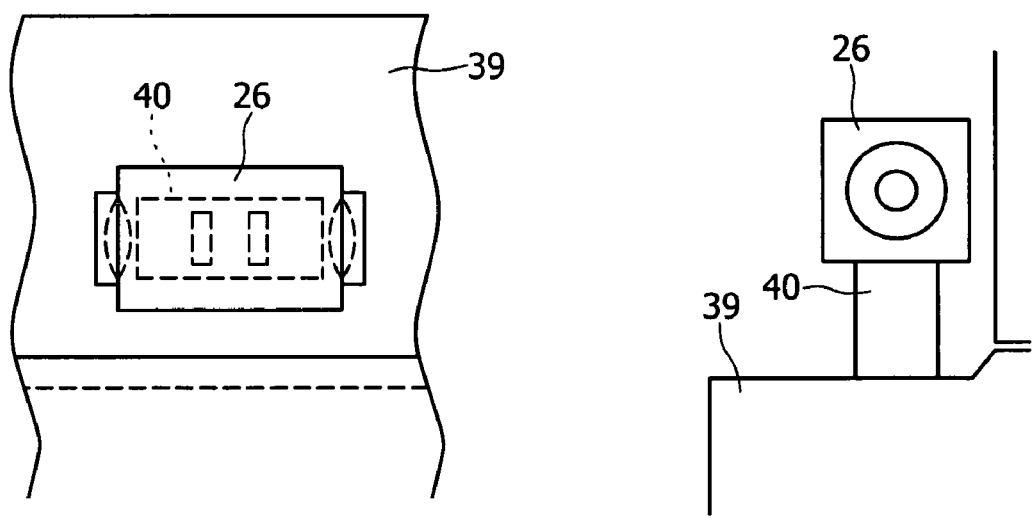

FIG.9

HUMIDITY Φi(%)

| °C\% | 20 | 30 | 40 | 50 | 60 | 70 | 80 | 90 |
|---|---|---|---|---|---|---|---|---|
| 5 | | | | | | | 1.8 | 3.5 |
| 6 | | | | | | | 2.8 | 4.5 |
| 7 | | | | | | 1.9 | 3.8 | 5.5 |
| 8 | | | | | | 2.9 | 4.8 | 6.5 |
| 9 | | | | | 1.6 | 3.8 | 5.7 | 7.4 |
| 10 | | | | | 2.6 | 4.8 | 6.7 | 8.4 |
| 11 | | | | | 3.5 | 5.7 | 7.7 | 9.4 |
| 12 | | | | 1.9 | 4.5 | 6.7 | 8.7 | 10.4 |
| 13 | | | | 2.8 | 5.4 | 7.7 | 9.6 | 11.4 |
| 14 | | | | 3.7 | 6.4 | 8.6 | 10.6 | 12.4 |
| 15 | | | 1.5 | 4.7 | 7.3 | 9.6 | 11.6 | 13.4 |
| 16 | | | 2.4 | 5.6 | 8.2 | 10.5 | 12.6 | 14.4 |
| 17 | | | 3.3 | 6.5 | 9.2 | 11.5 | 13.5 | 15.3 |
| 18 | | | 4.2 | 7.4 | 10.1 | 12.4 | 14.5 | 16.3 |
| 19 | | 1.0 | 5.1 | 8.4 | 11.1 | 13.4 | 15.5 | 17.3 |
| 20 | | 1.9 | 6.0 | 9.3 | 12.0 | 14.4 | 16.4 | 18.3 |
| 21 | | 2.8 | 6.9 | 10.2 | 12.9 | 15.3 | 17.4 | 19.3 |
| 22 | | 3.6 | 7.8 | 11.1 | 13.9 | 16.3 | 18.4 | 20.3 |
| 23 | | 4.5 | 8.7 | 12.0 | 14.8 | 17.2 | 19.4 | 21.3 |
| 24 | | 5.4 | 9.6 | 12.9 | 15.8 | 18.2 | 20.3 | 22.3 |
| 25 | 0.5 | 6.2 | 10.5 | 13.9 | 16.7 | 19.1 | 21.3 | 23.2 |
| 26 | 1.3 | 7.1 | 11.4 | 14.8 | 17.6 | 20.1 | 22.3 | 24.2 |
| 27 | 2.1 | 8.0 | 12.3 | 15.7 | 18.6 | 21.1 | 23.2 | 25.2 |
| 28 | 3.0 | 8.8 | 13.2 | 16.6 | 19.5 | 22.0 | 24.2 | 26.2 |
| 29 | 0.8 | 9.7 | 14.0 | 17.5 | 20.4 | 23.0 | 25.2 | 27.2 |

ROOM TEMPERATURE θi(°C)

CAMERA

The present application claims priority to Japanese Patent Application(s) JP2004-078216, filed in the Japanese Patent Office Mar. 18, 2004, the entire contents of which is incorporated herein by reference.

BACKGROUND OF THE INVENTION

The present invention relates to a camera, particularly to a camera including an optical system for condensing picture rays onto a light-receiving surface of a solid state image pickup device (CCD) to thereby perform imaging.

CCD cameras using solid state image pickup devices, for example, those disclosed in Japanese Patent Nos. 3277974 and 3297946 have been widely used. Generally, a CCD type solid state image pickup device has a configuration in which light receiving devices for constituting pixels are arranged in a matrix, signals obtained by photo-electric conversion at each light receiving device are read out to a vertical register provided in correspondence with each vertical column of the light receiving devices, the signals are transferred in the vertical direction by the vertical register, the signals are transferred in the horizontal direction by a horizontal transfer register, the signals are converted into voltages by an output unit such as an FDA, and the voltages are outputted to the exterior of the camera.

The cameras using the CCD as above are used not only as still cameras and video cameras but also as cameras which are mounted, for example, to an outside portion of a vehicle body of an automobile or in a compartment of an automobile.

FIG. 13 shows one example of such an automotive camera, in which a CCD 3 is mounted on a substrate 2 disposed in a casing 1, a lens-barrel 5 is disposed on the front side of the CCD 3, and picture rays are condensed onto a light receiving surface of the CCD 3 by lenses 6, 7, 8 and 9 held in the inside of the lens-barrel 5, to form an image. In addition, an opening on the front side of the lens 6 and on the front side of the casing 1 is covered with a protective plate 10.

Such an automotive camera according to the related art has the defect of generation of dewing on the inside surface of the protective plate. Specifically, as shown in FIG. 13, the lenses 6 to 9 are provided in the inside of the camera, and the protective plate 10 composed of a glass or plastic transparent plate is disposed on the front side thereof, so that a plurality of air layers are not present between the outside air and the air layer inside the camera, the temperature difference or temperature gradient between the outside air and the inside of the protective plate 10 is therefore enlarged, and, since the capacity of air inside the camera which makes contact with the protective plate 10 is large, dewing is liable to occur on the inside surface of the protective plate 10.

In view of this problem, as shown in FIG. 14, a glass heater 13 formed by vapor deposition of a metal, for example, is provided on the outer peripheral side of the protective plate 10, and an electric current is supplied to the glass heater 13 from a substrate 2 through lead wires 14, to thereby warm up the protective plate 10 through the glass heater 13. This configuration makes it possible to prevent the surface temperature of the protective plate 10 from being lowered and to prevent the dewing from occurring. However, this leads to an increase in cost due to the glass heater 13, or an increase in electric power consumption due to the power consumption by the glass heater 13, and the rise in the temperature inside the camera produces bad influences on the electric component parts, particularly semiconductor devices inclusive of the CCD 3, which are present inside the camera.

FIG. 15 shows another measure for preventing the dewing. Here, a moisture absorbent 15 such as silica gel is disposed at a predetermined position inside a casing 1, whereby the humidity inside the camera is lowered so as to prevent the generation of dewing. In this case, however, there is the problem that the moisture absorbed into the moisture absorbent as time passes is discharged as water vapor upon a temperature rise due to a camera operation, with the result of dewing, or that the moisture absorbent generates dust or debris. Furthermore, the moisture absorbent 15 leads to an increase in cost and to the need to secure a space for arranging the moisture absorbent 15.

SUMMARY OF THE INVENTION

It is an object of the present invention to provide a camera in which dewing does not occur on transparent members in an optical path for introducing picture rays.

It is another object of the invention to provide a camera in which a protective plate leading to dewing thereon is absent.

It is a further object of the invention to provide a camera in which prevention of dewing by electric heating is not needed.

It is yet another object of the invention to provide a camera which does not need a moisture absorbent for absorbing moisture inside the camera.

The above objects of the present invention will become clear from the technical thought and embodiments of the present invention which will be described below.

In accordance with one aspect of the present invention, there is provided a camera including an optical system for condensing picture rays onto a light receiving surface of a solid state image pickup device to thereby perform imaging, wherein the optical system is comprised of a plurality of lenses, the lenses are held on a lens-barrel in the state of being aligned in an optical axis direction, and gaps between the lenses and the lens-barrel are eliminated so as to form spaces shield from the exterior by the lens-barrel and the plurality of lenses.

Here, n lenses may be aligned inside the lens-barrel along the optical axis direction so as to form n−1 spaces along the front-rear direction in the optical axis direction. In addition, seal members may be interposed between the lenses and the lens-barrel so as to form spaces shielded from the exterior by the seal members.

In accordance with another aspect of the present invention, there is provided a camera including an optical system for condensing picture rays onto a light receiving surface of a solid state image pickup device to thereby perform imaging, wherein the optical system is comprised of a lens-barrel having a plurality of lenses, spaces shielded from the exterior are formed between the plurality of lenses, and the lens-barrel is disposed on the outside of a casing.

Here, a female screw hole may be provided on the front side of the casing and on the front side of the solid state image pickup device, and a male screw formed at an outer peripheral portion of the lens-barrel may be set in screw engagement with the female screw hole. In addition, the lens-barrel may be mounted to the casing so that the lens on the frontmost side in the optical system is located on the front side of a front surface plate of the lens-barrel.

Besides, the camera may be a camera mounted to the outside of an automobile. Alternatively, the camera may be a camera mounted in a compartment of an automobile. In addition, the camera may be connected to a display unit disposed at such a position as to be seen from a driver's seat of an automobile, and a picture picked up may be displayed by the display unit.

A preferred embodiment of the present invention is so configured as to make it difficult for dewing from occurring on the lens surfaces in the camera or the inside surface of the camera, in which a plurality of air layers are provided by a lens frame and the lenses, there is little distribution of air between the air layers, and it is difficult for the temperature inside the casing to be transmitted to the lens surfaces. This configuration is not limited to the one composed of the plurality of lenses and the lens frame, and may be a structure in which a protective transparent cover or transparent plate, an outer frame for holding the transparent cover or transparent plate, and a lens block are collected on the front side relative to the lens located on the frontmost side.

According to the embodiment as above, it is possible to produce a camera in which it is difficult for dewing to occur, particularly on the inside of the lenses. In addition, since the lens block can be so structured as to be separable from the camera main body, a camera having a different angle of view from the original camera can be easily configured by simply replacing the original lens block by another lens block having the different angle of view.

Besides, since there is no need for a glass heater or a moisture absorbent for preventing dewing, the cost for such a dewing-preventive unit is precluded, there is no need for space for laying out such a glass heater or moisture absorbent or a peripheral equipment thereof, and the camera can therefore be made small in size. In addition, since a glass heater is not needed, electric power consumption is reduced, the rise in the temperature inside the camera is suppressed, and bad influences on semiconductor component parts are restrained. Further, generation of water vapor from a moisture absorbent due to a rise in the inside temperature, and the resultant dewing, can be obviated. Furthermore, there is no fear that scum or dust might be generated from a moisture absorbent to produce bad effects on the image.

BRIEF DESCRIPTION OF THE DRAWINGS

The above objects, features and advantages of the present invention will become apparent from the following description and appended claims, taken in conjunction with the accompanying drawings, in which:

FIG. 2 is a partly broken perspective view on the back side of a door mirror fitted with the camera;

FIGS. 3A and 3B show a front view and a side view showing the condition where a side view camera is mounted on a front bumper;

FIG. 9 is a dew-point temperature table;

DETAILED DESCRIPTION OF THE PREFERRED EMBODIMENTS

Figure 1:
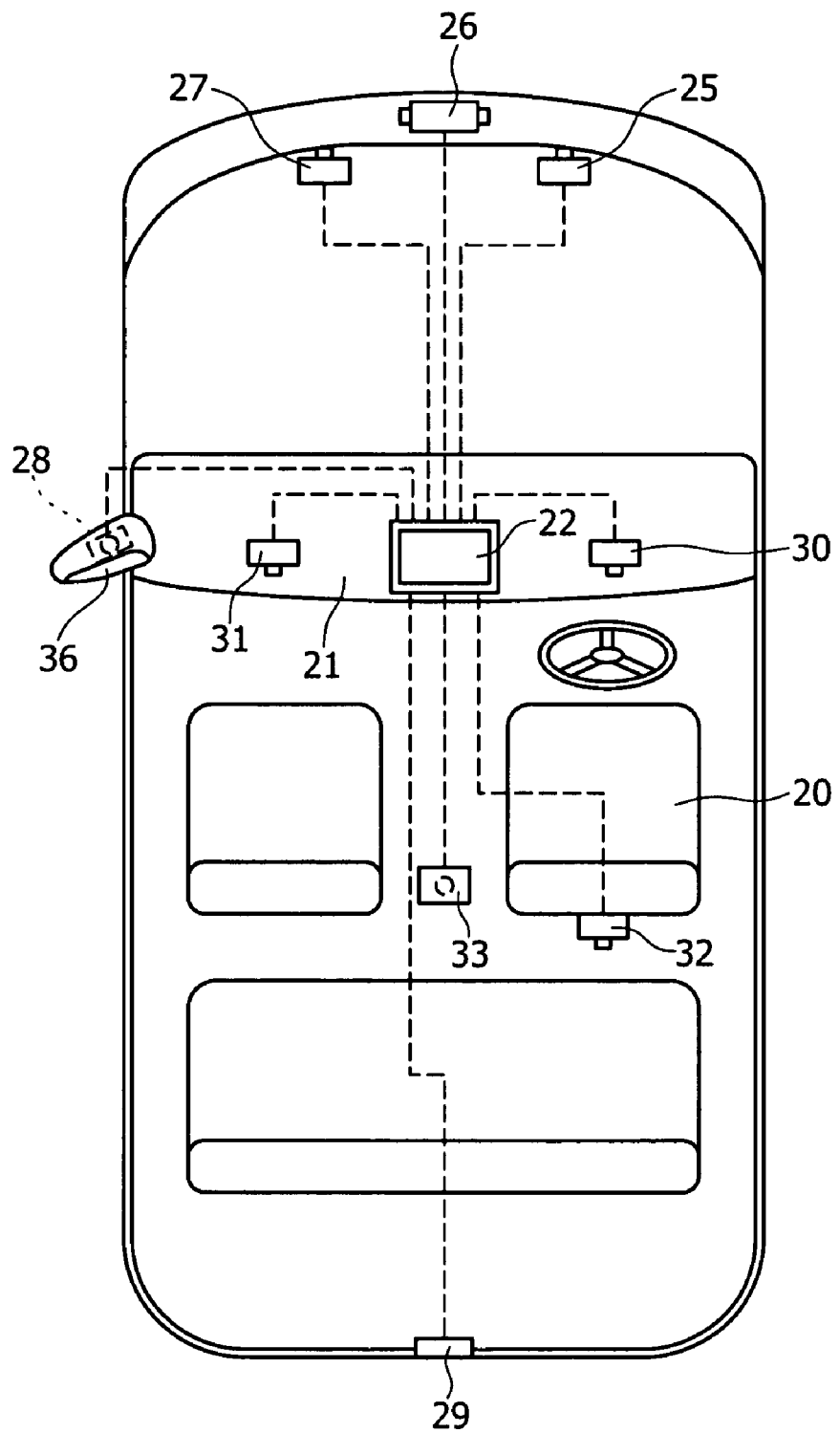
FIG. 1 is a plan view showing the overall configuration of an automobile fitted with a camera.

Now, the present invention will be described below referring to an embodiment shown in the figures. FIG. 1 shows the overall configuration of an automobile fitted with a camera according to this embodiment, in which a display system 22 is disposed on a substantially central portion of an instrument panel 21 on the skew front side of a driver's seat 20 of the automobile. The display system 22 is composed, for example, of a liquid crystal display panel, functions to display an image picked up by the camera, and functions also as a car navigation display system.

Cameras to be connected to the display system 22 include a front view camera 25, a side view camera 26, a night eye camera 27, a left side view camera 28, a rear view camera 29, a driver's seat monitor camera 30, an assistant driver's seat camera 32, a security camera 33 and the like. All the cameras 25 to 33 may not necessarily be provided, and some of them may be provided.

The front view camera 25 is a camera for visually checking the area directly below and on the front side of the vehicle. The left side view camera 28 is disposed inside a case 37 of the left-side door mirror 36 and on the back side of the mirror as shown in FIG. 2, for obtaining a field of view of the left side, particularly the left lower side which constitutes a dead angle from the driver's seat 20. Incidentally, an auxiliary illumination 38 is provided at a side portion of the left side view camera 28. In addition, the side view camera 26 is for visually checking the vehicle from both the left and right sides on a T road or the like, and is mounted to an upper portion of the front bumper 39 through, for example, a bracket 40, as shown in FIG. 3.

The night eye camera 27 is an infrared camera, for obtaining a front field of view in the night, particularly that which is not seen with a visible-ray headlight. The rear view camera 29 is provided at a rear portion of the vehicle, for visually checking the rear field of view at the time of moving rearwards.

The driver's seat monitor camera 30 is a monitor camera for detecting the driver's sleeping through detecting a wink or the like of the driver seated in the driver's seat 20. The assistant driver's seat monitor camera 31 is for monitoring a child, for example, in the case where the child is seated on the assistant driver's seat. The security camera 33 is a camera attached to the lower side of the ceiling of the compartment which, in the case of a mischief or the like during parking, obtain the image of the mischief or the like to be transmitted to a cellular phone of another driver being remote from this vehicle.

Figure 4:
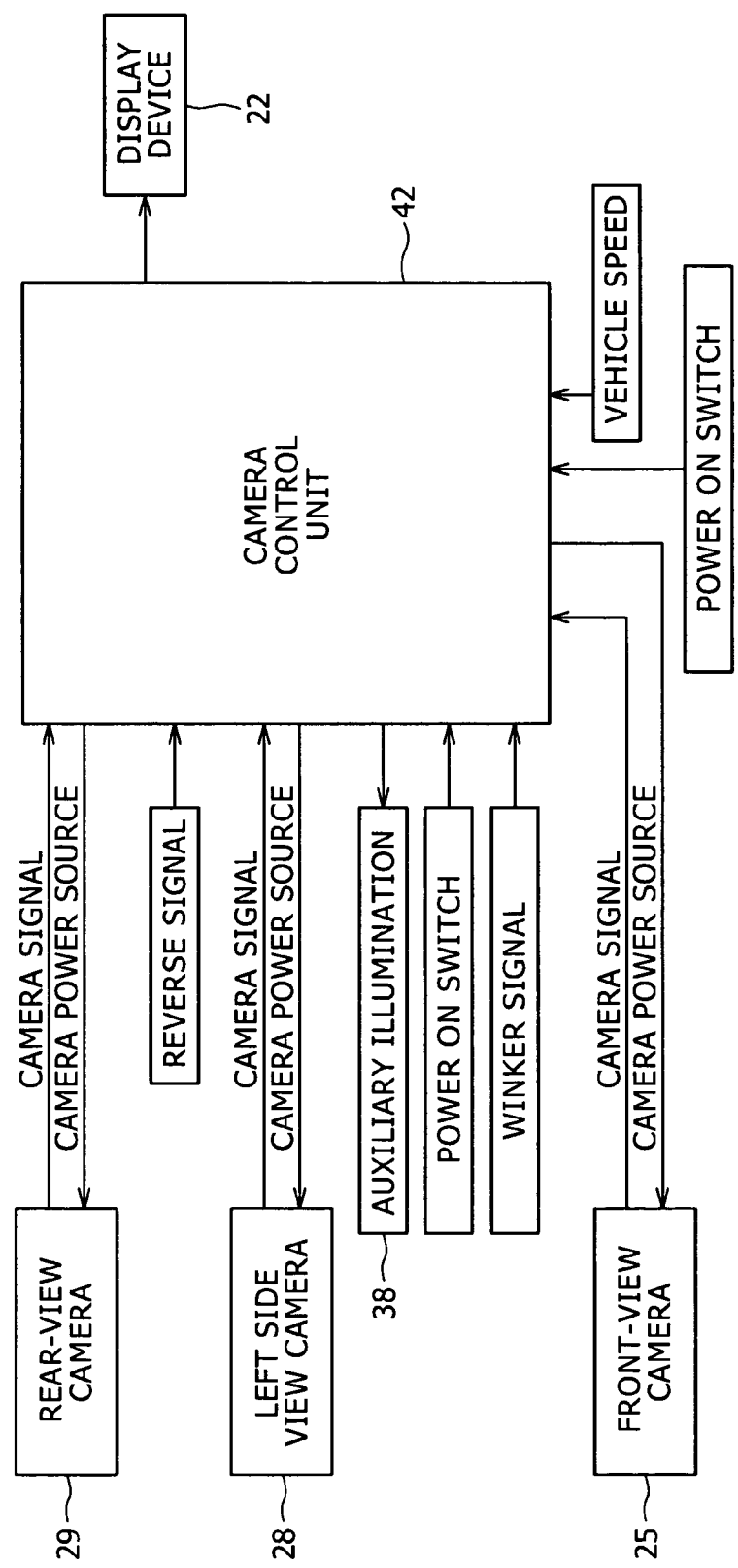
FIG. 4 is a block diagram showing the connection of the camera with a control unit.

These cameras are connected to a camera control unit 42, as shown in FIG. 4. In addition, the auxiliary illumination 38 coupled with the left side view camera 28 is connected to the camera control unit 42. The pictures picked up by the cameras 25, 28, 29, etc. are transferred to and displayed on the display system 22 through the camera control unit 42.

Now, an example of an automotive camera which is as above-mentioned and is mounted to the outside of the vehicle will be described below, referring to FIGS. 5 and 6. The camera includes a roughly rectangular parallelopiped casing which is composed of a polyamide-made front casing 47 and an aluminum die-cast rear casing 48. A mounting substrate 49 is disposed inside the casing 48, and a CCD 50 is mounted on the mounting substrate 49. Specifically, leads 50 extended on both sides of the CCD 50 are soldered in the state of making contact with a wiring pattern of the mounting substrate 49, whereby the CCD 50 is mounted on the mounting substrate 49. Incidentally, the mounting substrate 49 with the CCD 50 mounted thereon is connected to the exterior through a cord 52.

The front casing 47 is provided with a projected portion 54 projected to the front side, and the inner peripheral surface of the projected portion 54 is provided with a female screw hole 55. A lens-barrel 56 is put in screw engagement with the female screw hole 55.

In the lens-barrel 56, four lenses 61, 62, 63 and 64 are arranged from the front side toward the rear side in an optical axis direction, with a plurality of spacers 57, 58 therebetween. A holder nut 60 is set in screw engagement with a male screw 59 provided in the outer peripheral surface on the tip end side of the lens-barrel 56, whereby an outer peripheral portion of the lens 61 on the frontmost side is held. An O-ring 65 is interposed between the lens 61 and the lens-barrel 56, and an O-ring 66 is interposed between the lens 64 and the lens-barrel 56. Besides, an O-ring 67 is interposed between the lens-barrel 56 and the inner peripheral surface of the projected portion 54 of the front casing 47.

With this configuration, a space 68 is formed between the lenses 61 and 62, a space 69 is formed between the lenses 62 and 63 and on the inner peripheral side of the spacer 57, and a space 70 is formed between the lenses 63 and 64 and on the inner peripheral side of the spacer 58.

Figure 5:
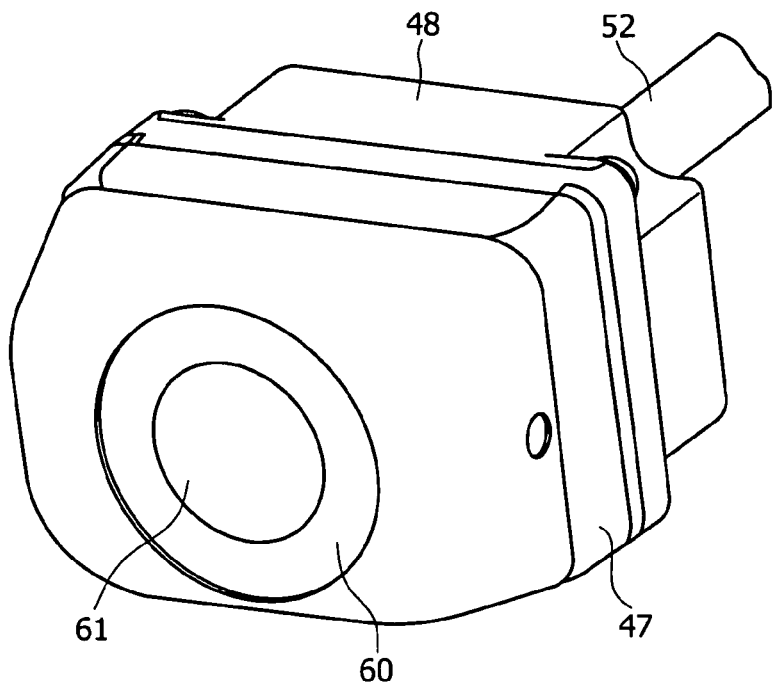
FIG. 5 is a perspective view of the camera.
Figure 6:
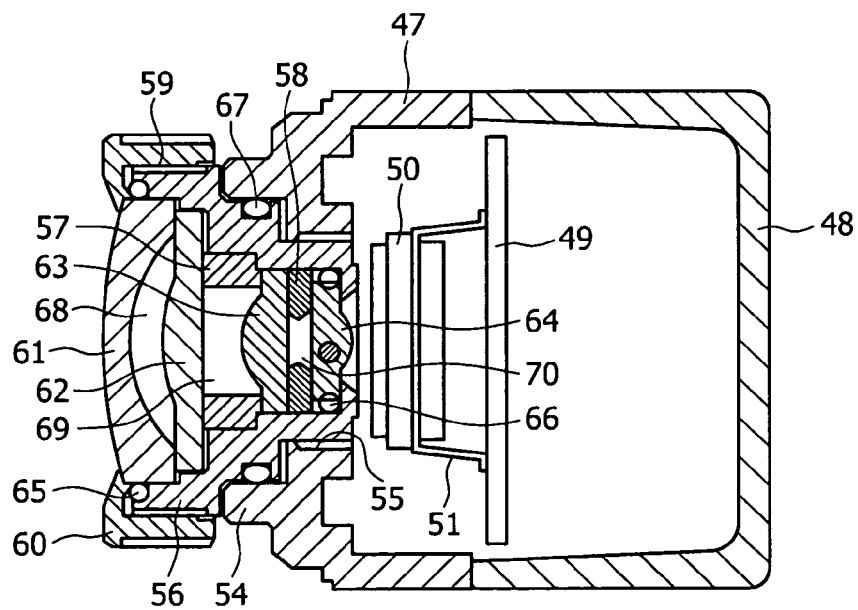
FIG. 6 is a vertical sectional view of the camera.
Figure 7:
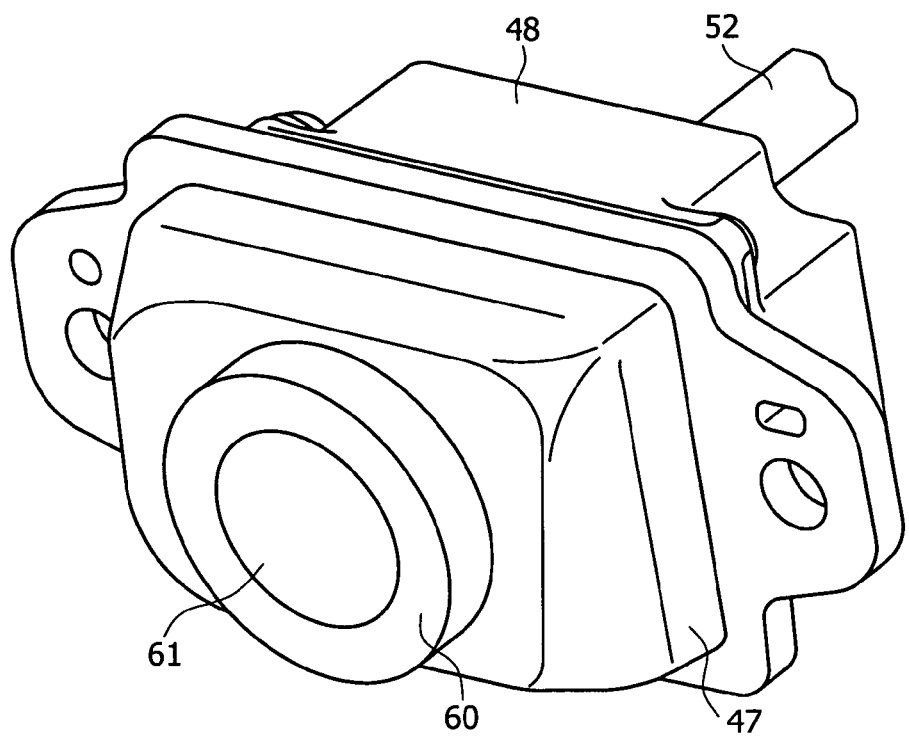
FIG. 7 is a perspective view of a camera according to a modified embodiment.
Figure 8:
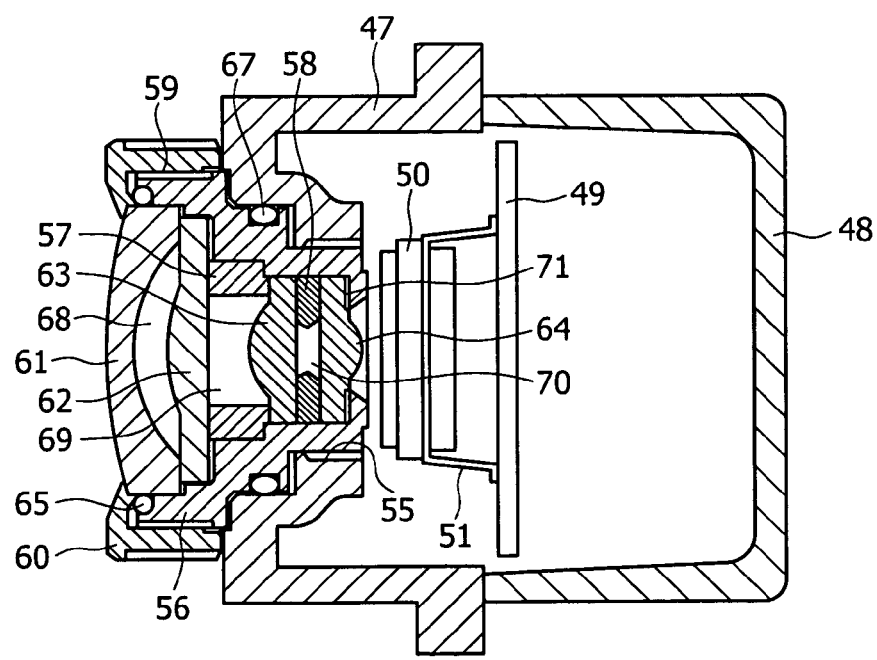
FIG. 8 is a vertical sectional view of the camera.

FIGS. 7 and 8 show a camera obtained by slightly modifying the camera shown in FIGS. 5 and 6. Here, an annular seal ring 71 is disposed on the back side of the lens 64, in place of the provision of the O-ring 66 on the outer peripheral side of the lens 64. Incidentally, the seal ring 71 is formed, for example, of an acrylic resin, and is attached to the lens-barrel 56 by adhesion. In addition, in this camera, a mount flange 72 projecting outwards is provided at a joint portion, for joining to the rear casing 48, of the casing 47. The other configurations are substantially the same as in FIGS. 5 and 6.

In the cameras shown in FIGS. 6 and 8, picture rays passing through the lenses 61, 62, 63 and 64 are condensed onto a light receiving surface of the CCD 50 mounted on the mounting substrate 49, to form an image. Therefore, the CCD 50 generates an electrical signal according to the picture, and the electrical signal is supplied through the cord 52 to the camera control unit 42 shown in FIG. 4. The camera control unit 42 processes the signal, and transmits the processed signal to the display system 22, which regenerates the picked-up picture.

Here, particularly at the time of image pickup, electric currents flow in the semiconductor devices including the CCD 50, so that heat is generated in the CCD 50 and the mounting substrate 49, whereby the temperature inside the casings 47 and 48 is raised. However, due to the presence of the O-ring 66 or the seal ring 71 disposed on the outer peripheral side of the lens 64 at a rearmost portion in the lens-barrel 56, distribution of air between the space inside the lens-barrel 56 and the space inside the casings 47 and 48 is perfectly prevented. Therefore, heated air inside the casings 47 and 48 would not flow into the lens-barrel 56, and the lenses 63, 62 and 61 on the front side relative to the lens 64 are little influenced by the temperature.

In other words, the space between the lenses 63 and 64 is shielded from the other spaces by the spacer 58. In addition, the space between the lenses 62 and 63 is shielded from the other spaces by the spacer 57. The space 68 between the lenses 61 and 62 is shielded from the other spaces due to the direct contact of the lenses 61 and 62 on both sides thereof with each other. Further, the space 68 between the lenses 61 and 62 is shielded from the outside air by the O-ring 65.

Therefore, the air layers in these spaces 68, 69 and 70 ensure that the temperature of particularly the lens 61 on the frontmost side is little raised. This means that no temperature difference is generated between the outside surface and the inside surface of the lens 61. Accordingly, dewing does not occur on the inside surface of the lens 61, particularly the surface fronting on the space 68.

Generally, in the camera as shown in FIG. 6 or 8, the generation of heat at the substrate 49 or the like inside the camera produces a difference between the temperature inside the casings 47 and 48 and the outside air temperature. When the inside temperature becomes higher than the outside air temperature, the surface temperature of the lens 61 on the frontmost side is lowered, and, when the temperature in the vicinity of the inside surface of the lens 61 reaches the dew-point temperature, water droplets are deposited on the surface or the inside of the lens 61. This is dewing.

Specifically, the maximum amount of water vapor containable in air at a certain temperature is generally called saturated water vapor amount, and the air in this instance is called saturated air. The amount of water vapor containable in air varies depending on temperature, and more water vapor is containable as the temperature is higher. When the temperature of saturated air is lowered, the water vapor in the air condenses into dew. The saturation temperature of air which contains the water vapor in this manner is referred to as dew-point temperature. The dew-point temperature is determined by absolute humidity.

Figure 10:
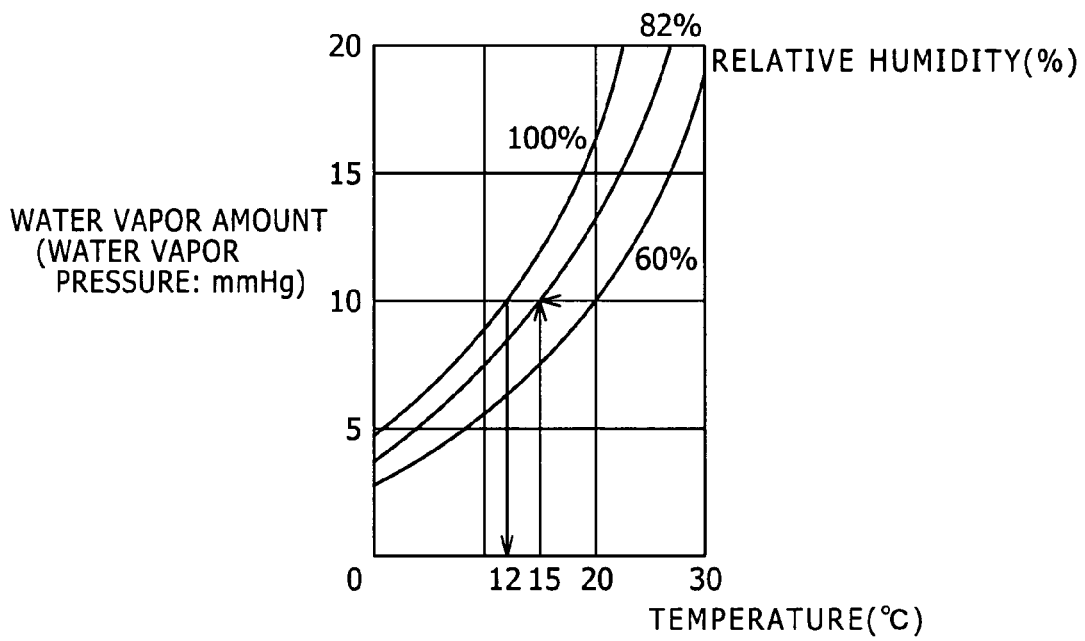
FIG. 10 is a graph illustrating the mechanism of generation of dewing.
Figure 11:
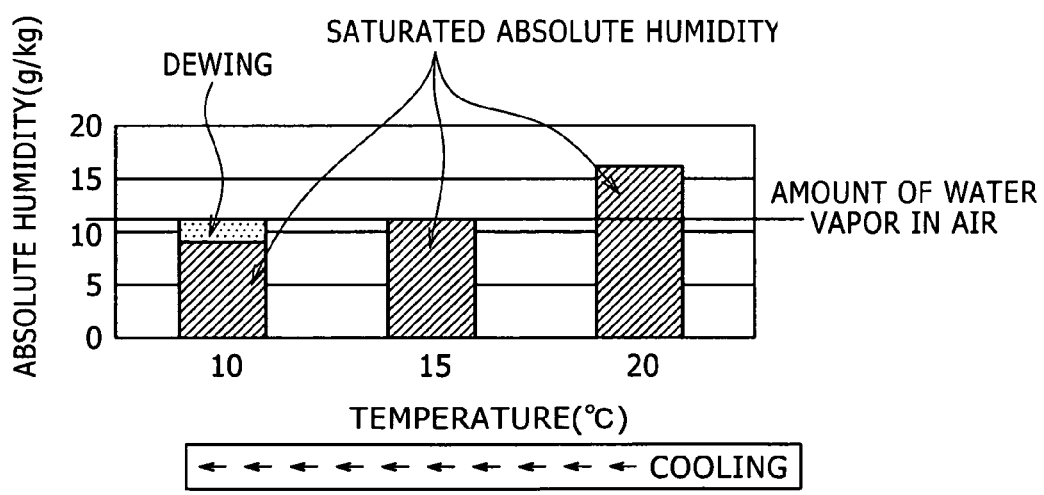
FIG. 11 is a graph showing the relationship between dew point and dewing.

For example, in the dew-point temperature table shown in FIG. 9, the dew-point temperature in the case where the air temperature is 20° C. and the relative humidity is 60% is 12° C. Therefore, when the air temperature is lowered to 12° C., dew is generated (see FIGS. 10 and 11).

Figure 12:
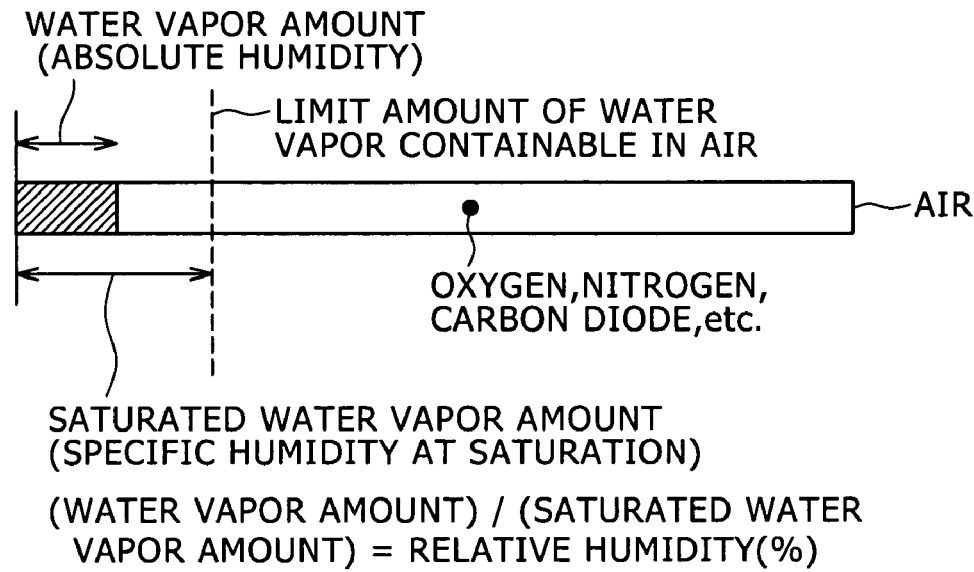
FIG. 12 is a graph showing the relationship between absolute temperature and relative humidity.
Figure 13:
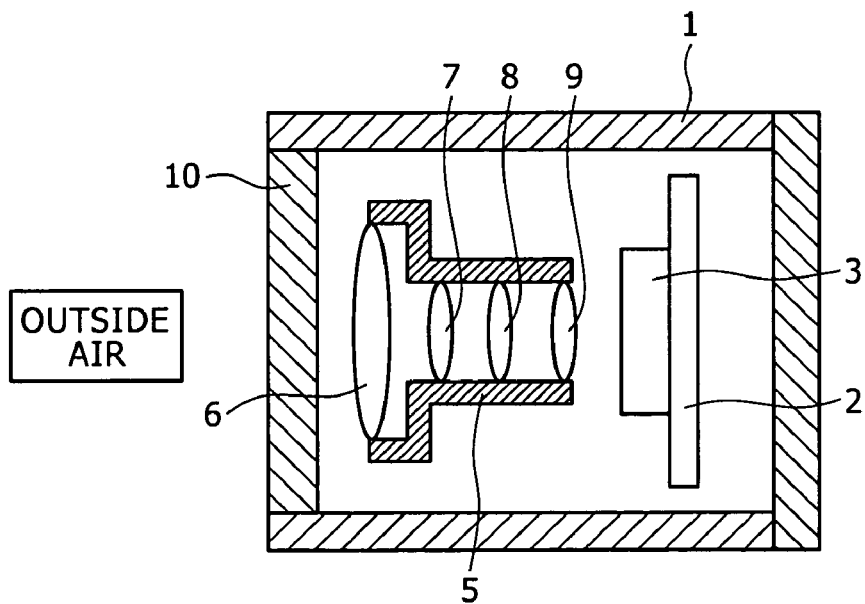
FIG. 13 is a vertical sectional view of a camera according to the related art.
Figure 14:
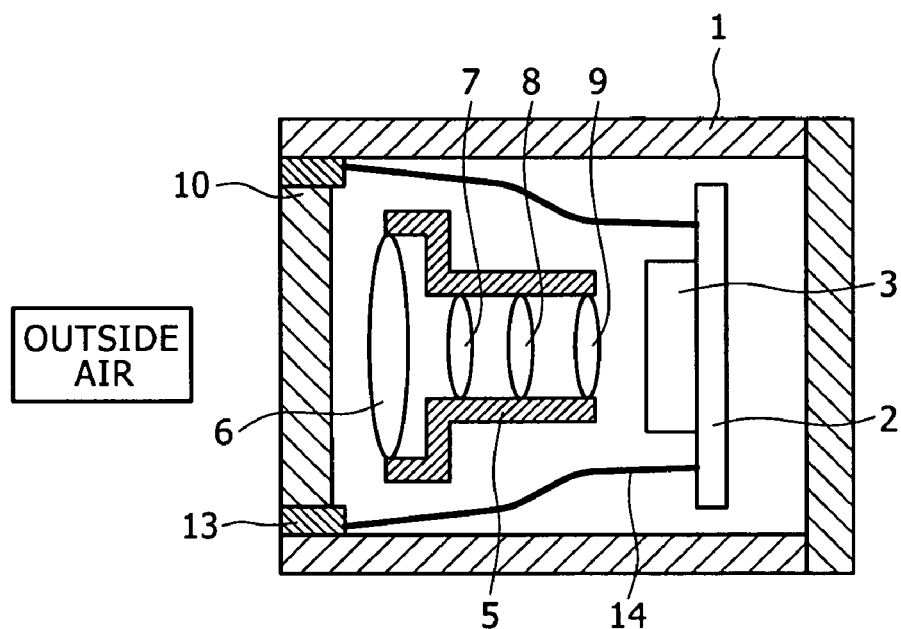
FIG. 14 is a vertical sectional view of another camera according to the related art.
Figure 15:
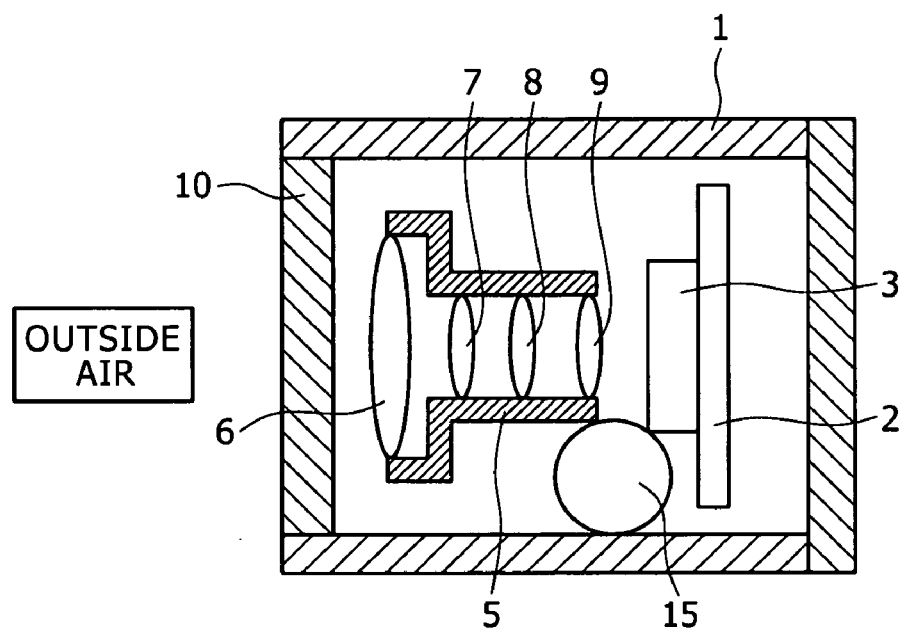
FIG. 15 is a vertical sectional view of a further camera according to the related art.

In addition, the amount (absolute amount) of water vapor contained in air is called absolute humidity (g/kg) (see FIG. 12). On the other hand, the ratio of the amount of water vapor (absolute humidity) to the limit amount of water vapor containable in air, i.e., to the specific humidity at saturation, is represented by relative humidity as shown in FIG. 12. The humidity in general use is the relative humidity, and dewing occurs when the relative humidity exceeds 100%.

Therefore, from this theory, it can be said that for obtaining a camera free of the possibility of dewing, it suffices to reduce the amount of water vapor (absolute humidity) inside the casings 47 and 48 of the camera; in this case, it suffices to reduce the inside volume. Besides, it is necessary to reduce the temperature difference between the inside of the camera and the outside air.

In this embodiment, as shown in FIG. 6 or 8, air is partitioned by the plurality of lenses 61 to 64 and the lens-barrel or lens frame 56, so as to form the plurality of air layers 68, 69 and 70, whereby the amount of water vapor in air is reduced. The clearances between the lenses 61 to 64 and the lens frame 56 are reduced, whereby flow of air between the air layers is substantially precluded, to prevent dewing. This is the same principle as that of the heat-insulating double sash.

In addition, as shown in FIGS. 6 and 8, the lens block composed of the lens-barrel 56 holding the lenses 61 to 64 is provided in the exterior of the casings 47 and 48 of the camera, whereby the temperature gradient between the outside air and the inside of the camera is moderated, and it is made difficult for the raised temperature inside the camera to be transmitted to the surface or inside surface of the lens 61. Namely, the temperature difference between the outside air and the inside surface of the outermost lens 61 is reduced to thereby enhance the heat-insulating effect.

As to the cameras shown in FIGS. 6 and 8, actual verification experiments were carried out, to obtain the following results. For acceleration of dewing, the condition where high-temperature high-humidity air is contained in the inside of the camera is prepared. In the condition where the casings 47 and 48 of the camera are open, the camera is left to stand for 12 hours in a high-temperature high-humidity atmosphere (temperature 40° C., humidity 95%) which is considered to be the condition of the maximum humidity on a practical-use basis, and, in this atmosphere, the casings 47 and 48 are closed. Then, for cooling the camera, the camera is left to stand in a 20° C. atmosphere. Thereafter, an electric current is passed in the mounting substrate 49 of the camera, for producing a difference between the outside air temperature and the temperature inside the camera.

The experiments as above showed that the cameras shown in FIGS. 6 and 8 make it more difficult for dewing to occur, as compared with cameras according to the related art. In addition, it was revealed that the cameras according to the present invention make it more difficult for dewing to occur, as compared with a camera in which a partition wall is provided for bisecting the inside of a casing, a lens-barrel is held by the partition wall, and a circuit substrate provided with a CCD is disposed on the back side of the partition wall.

While the present invention has been described above referring to the embodiments shown in the drawings, the invention is not limited to the above-described embodiments, and various modifications are possible within the scope of the technical thought of the invention described herein. For example, while the above-described embodiments are related to the automotive cameras which are mounted onto outer plates of an automobile, the present invention is applicable to other various types of cameras, particularly various cameras which are required to have a drip-proof structure or water-proof structure.

What is claimed is:

1. A camera comprising an optical system for condensing picture rays onto a light receiving surface of a solid state image pickup device to thereby perform imaging, wherein
said optical system is comprised of a plurality of lenses, said lenses are held within a lens-barrel in the state of being aligned in an optical axis direction, wherein any gap or space between adjacent lenses is sealed to prevent moisture from degrading operation of the solid state image pick-up device, a ring element interposed between at least one of the lenses and the lens barrel and wherein the ring element is located at an outer perimeter of an outermost lens and being in contact with an inner annular portion of the lens-barrel and wherein a locking member is secured to an outer portion of the lens barrel, the locking member securing the outermost lens and causing the ring element to compress and seal a boundary between the outermost lens and the lens barrel, and further comprising a further sealing ring located between an outer portion of the lens barrel and an inner annular protrusion of a housing for the solid state image pickup device.

2. The camera according to claim 1, wherein n lenses are arranged in said lens-barrel along said optical axis direction so as to form n–1 spaces along the front-rear direction in said optical axis direction.

3. The camera according to claim 1, wherein a plurality of seal members are interposed between said lenses and said lens-barrel so as to form spaces shielded from the exterior by said seal members.

4. The camera according to claim 1, which is mounted to the outside of an automobile.

5. The camera according to claim 1, which is mounted in a compartment of an automobile.

6. The camera according to claim 1, which is connected to a display unit disposed at such a position as to be seen from a driver's seat of an automobile, and a picture picked up is displayed by said display unit.

7. A camera comprising an optical system for condensing picture rays onto a light receiving surface of a solid state image pickup device to thereby perform imaging, wherein
said optical system is comprised of a lens-barrel having a plurality of lenses, a ring element interposed between at least one of the lenses and the lens barrel and wherein any gap or space between adjacent lenses is sealed to prevent moisture from degrading operation of the solid state image pick-up device, and
said lens-barrel is disposed on the outside of a casing and wherein the ring element is located at an outer perimeter of an outermost lens and being in contact with an inner annular portion of the lens-barrel and wherein a locking member is secured to an outer portion of the lens barrel, the locking member securing the outermost lens and causing the ring element to compress and seal a boundary between the outermost lens and the lens barrel, and further comprising a further sealing ring located between an outer portion of the lens barrel and an inner annular protrusion of a housing for the solid state image pickup device.

8. The camera according to claim 7, wherein a female screw hole is provided on the front side of said casing and on the front side of said solid state image pickup device, and a male screw formed at an outer peripheral portion of said lens-barrel is set in screw engagement with said female screw hole.

9. The camera according to claim 7, wherein said lens-barrel is mounted to said casing so that said lens on the frontmost side in said optical system is located on the front side of a front surface plate of said lens-barrel.

* * * * *